(12) United States Patent
Pickering et al.

(10) Patent No.: US 7,027,522 B2
(45) Date of Patent: Apr. 11, 2006

(54) SYSTEMS FOR DATA TRANSMISSION

(75) Inventors: Andrew Pickering, Rugby (GB); Sue Simpson, Buckingham Bucks (GB); Andrew Joy, Great Houghton (GB)

(73) Assignee: Texas Instruments Incorporated, Dallas, TX (US)

( * ) Notice: Subject to any disclaimer, the term of this patent is extended or adjusted under 35 U.S.C. 154(b) by 794 days.

(21) Appl. No.: 09/915,921

(22) Filed: Jul. 25, 2001

(65) Prior Publication Data

US 2002/0061072 A1    May 23, 2002

(30) Foreign Application Priority Data

Nov. 17, 2000  (GB) ................................. 0028134

(51) Int. Cl.
*H04L 25/34* (2006.01)
(52) U.S. Cl. ........................................ 375/286
(58) Field of Classification Search ............... 375/295
See application file for complete search history.

(56) References Cited

U.S. PATENT DOCUMENTS 5,635,862 A * 6/1997 Abramson et al. .......... 326/105
5,761,244 A * 6/1998 Hedberg ...................... 375/257
6,229,472 B1 * 5/2001 Nishida ...................... 341/161
6,525,559 B1 * 2/2003 Wu et al. ...................... 326/30

FOREIGN PATENT DOCUMENTS

| EP | 0 458 390 A2 | 11/1991 |
|---|---|---|
| EP | 1 041 782 A2 | 10/2000 |
| GB | 2 060 317 A | 4/1981 |
| WO | WO 92/02988 | 2/1992 |
| WO | WO 98/28887 | 7/1998 |

* cited by examiner

*Primary Examiner*—Robert Pascal
*Assistant Examiner*—Krista Flanagan
(74) *Attorney, Agent, or Firm*—Rose Alyssa Keagy; W. James Brady, III; Frederick J. Telecky, Jr.

(57) ABSTRACT

A differential data transmission system that transmits encoded data symbols as differential signals. A signal for transmitting symbols on a set of at least three parallel channels, each channel having a first terminal, P1 to PN, and each channel having a second terminal connected to a common node Z. The signal comprising for each symbol an active signal on two of those channels and an inactive signal on the remaining channel or channels, the symbols being distinguishable by which two of the channels have the active signals.

20 Claims, 5 Drawing Sheets

SYSTEMS FOR DATA TRANSMISSION

This application claims priority under 35 USC 517 (e)(1) of British Application Number 0028134.5 filed Nov. 17, 2000.

This invention relates generally to data transmission and data encoding, and more particularly to the transmission of encoded data symbols transmitted as differential signals.

Figure 1:
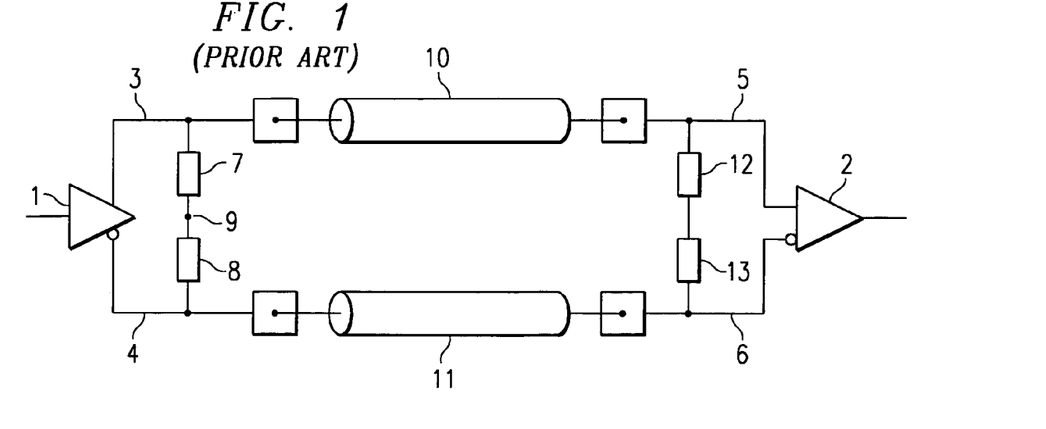
FIG. 1 is a block diagram of a known differential data transmission system.

A block diagram of a known differential data transmission system, known as the Low Voltage Differential Swing (LVDS) system, is shown in FIG. 1. That system includes a differential transmitter 1 and a differential receiver 2. First and second outputs of the differential transmitter 1 place voltage signals on to conductors 3 and 4 respectively, the potential difference between conductors 3 and 4 inducing a current to flow through a 100 ohm load comprising two 50 ohm resistors 7 and 8. A first terminal of resistor 7 is connected to conductor 3, a second terminal of resistor 7 is connected to a first terminal of resistor 8 and a second terminal of resistor 8 is connected to the second conductor 4. The first and second resistors 7 and 8 meet at a node 9 held at 1.2 volts. That voltage is the common mode voltage level in the LVDS system.

The voltage on one of conductors 3 and 4 is set at 1.4 volts and the voltage on the other is set at 1.0 volts so that the conductors are at the common mode voltage level plus or minus 0.2 volts. Thus, a current of 4 mA (0.4 volts/100 ohms) flows through resistors 7 and 8. The sense of flow of that current represents the symbol for transmission.

The signals on conductors 3 and 4 are transmitted over transmission lines 10 and 11; the conductors at the receiver end being labelled 5 and 6 (conductor 5 being coupled to conductor 3 and conductor 6 being coupled to conductor 4). Conductors 5 and 6 are terminated by a 100 ohm load, that load comprising two 50 ohm resistors 12 and 13. A first terminal of resistor 12 is connected to conductor 5, a second terminal of resistor 12 is connected to a first terminal of resistor 13 and a second terminal of resistor 13 is connected to the second conductor 6. The voltages on the conductors 5 and 6 are 1.4 V and 1.0 V (or vice-versa) and induce a current of 4 mA through those resistors. The sense of current flow represents the symbol transmitted and it is that sense that the receiver 2 is arranged to detect.

Figure 2:
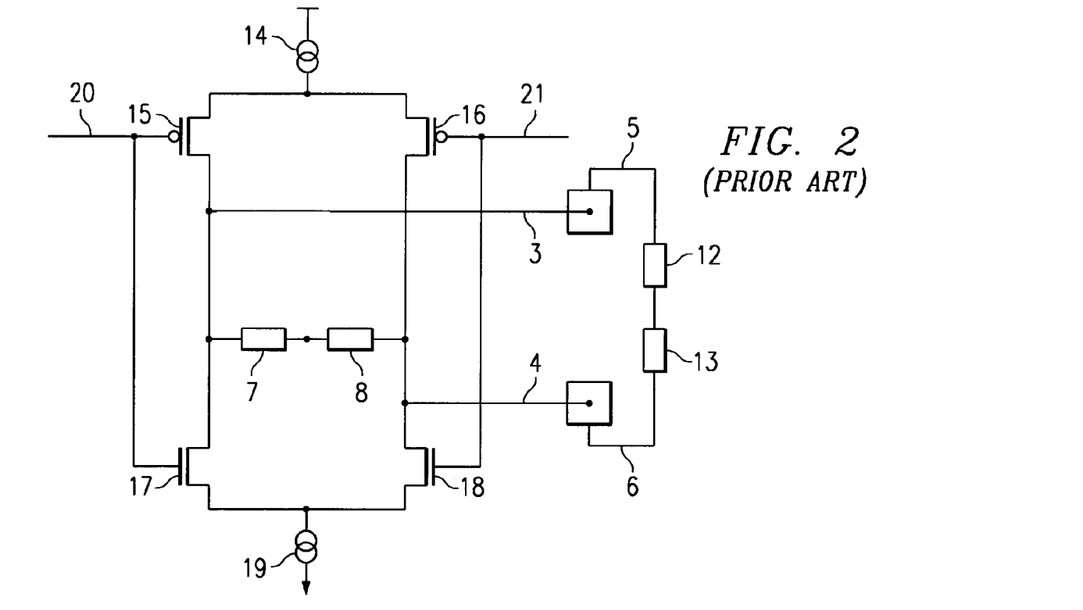
FIG. 2 is a circuit diagram of a transmitter suitable for the system of FIG. 1.

The system of FIG. 1 is also shown in FIG. 2 but with details of an implementation of the transmitter 1; circuit elements and connections corresponding to those of FIG. 1 having the same reference numerals. The transmitter 1 of FIG. 2 comprises a 8 mA current source 14 coupled to the sources of PMOS transistors 15 and 16, the drains of the PMOS transistors being connected to the drains of NMOS transistors 17 and 18 respectively. The sources of NMOS transistors 17 and 18 are coupled to a second 8 mA current source 19. The drains of transistors 15 and 17 are also connected to the first terminal of resistor 7, the second terminal of resistor 7 is connected to the first terminal of resistor 8 and the second terminal of resistor 8 is connected to the drains of transistors 16 and 18. The gate inputs of transistors 15 and 17 are coupled to a first input 20. The gate inputs of transistors 16 and 18 are coupled to a second input 21. The drains of transistors 15 and 17 and the first terminal of resistor 7 are coupled to the first output conductor 3. The drains of transistors 16 and 18 and the second terminal of resistor 8 are coupled to the second output conductor 4. For ease of analysing the transmitter circuit, the resistors 12,13 terminating the far end of the transmission lines 10,11 are also shown in FIG. 2.

Transistors 15 to 18 and current source 14 and sink 19 form a differential amplifier with inputs 20 and 21 and outputs 3 and 4. The mid-point 9 of the 100 ohm load of the differential amplifier is held at 1.2 V, as in FIG. 1.

With the input 21 high and the input 20 low (for example a logic 1 and a logic 0 respectively), transistors 15 and 18 are on and transistors 16 and 17 are off. A current therefore flows from current source 14 to current sink 19 via transistors 15 and 18, through loads 7 and 8. Similarly, a current flows through the terminating load comprising resistors 12 and 13. Since the loads are both 100 ohms, the 8 mA is split, with 4 mA flowing through loads 7 and 8 and 4 mA flowing through loads 12 and 13. Thus there is a 0.4V drop across resistors 7 and 8 so that conductors 3 and 5 are at 1.4V and conductors 4 and 6 are at 1.0V.

The 100 ohm differential termination of the transmitted signal has a number of advantages, in addition to providing the appropriate termination for the transmission line. For example, the transmitted signal does not rely on the power supply level at the receiver. Thus supply rail differences do not induce any common mode current flows.

As bandwidth requirements for data transmission systems increase, there is a growing demand for transmitting parallel data at high speeds. The use of the system of FIGS. 1 and 2 for such parallel data transmission (i.e. using several such systems in parallel) has a number of disadvantages. The pin count is high as each differential connection (i.e. each bit of data) requires two pins. The resistors at the receiver end consume the same amount of power as the corresponding resistors at the transmitter end, so the power consumption in both the transmitter and the receiver is high. The provision of control signals requires further signal lines adding further to the pin count and power overheads.

It is an object of the present invention to solve or mitigate some or all of the above-mentioned problems.

The present invention provides a signal for transmitting symbols on a set of at least three parallel channels, the signal comprising for each symbol an active signal on each of two of those channels and an inactive signal on the remaining channel or channels, the symbols being distinguishable by which two of the channels have the active signals. Preferably, the two active signals are of different form, allowing them to be distinguished from each other, the symbols being further distinguishable thereby.

In one embodiment, one of the active signals is an electrical signal at a first voltage level and the other an electrical signal at a second voltage level. The inactive signal or signals may be an electrical signal at a voltage level intermediate to the first and second voltage levels, for example at a voltage level substantially half-way between the first and second voltage levels.

In an alternative embodiment, one of the active signals is provided as a current of a first sense and the other active signal as a current of a second sense, the first and second sense being opposite to each other. The inactive signal may have a current that is substantially zero.

The present invention also provides a method of transmitting data comprising encoding it as a series of symbols using the signal of the invention.

The present invention also provides an encoder for transmitting data symbols from a set of at least three terminals, the encoder being arranged to provide for each of the symbols an active signal on two of the terminals of the set while providing an inactive signal on the remaining terminal or terminals of the set. Preferably, the encoder is arranged to provide the two active signals in different form allowing them to be distinguished from each other.

In one embodiment, the encoder is arranged to provide one of the active signals as an electrical signal at a first voltage level and the other active signal as an electrical signal at a second different voltage level. The encoder may be arranged to provide the inactive signal or signals as an electrical signal at a voltage level intermediate to the first and second voltage levels of the active signals, for example at a voltage level substantially half-way between the first and second voltage levels.

In an alternative embodiment, the encoder is arranged to provide one of the active signals as current of a first sense and the other active signal as a current of a second sense, the first and second senses being opposite to one another. The inactive signal or signals may be provided by not actively providing a current signal on the remaining terminal or terminals.

The encoder may comprise first and second sets of switches, one switch from each of the first and second sets being connected to a respective one of the terminals, the encoder being arranged to activate a selected one of the first set of switches in order to provide one of the active signals on the terminal to which that switch is connected and the encoder arranged to activate a selected one of the second set of switches in order to provide the other active signal on a terminal to which that switch is connected. The remaining switches may be inactive in order to provide an inactive signal on the or each remaining terminal. Each switch in the first set of switches may be coupled to a first voltage level and each switch in the second set of switches may be coupled to a second voltage level. Each switch in the first set of switches may be coupled to a first current source and each switch in the second set of switches may be coupled to a second current source. Each terminal of the encoder may be coupled, via a resistor, to a common node and that common node may be at a/the voltage level intermediate to the voltage levels on the terminals carrying the first and second active signals.

The present invention further provides a decoder for receiving data symbols presented at a set of at least three terminals, the decoder being arranged to detect which two of the terminals have an active signal and to identify in response which symbol is being received.

Preferably, the decoder is further arranged to detect which of the two active signals is of a first form and which is of a second form, and to use that information in said identification of the symbol received.

The decoder may be arranged to detect which of said terminals is at a first active voltage level and which of said terminals is at a second active voltage, that information being used in said identification of the symbol received. The decoder may be arranged to compare the voltage levels on the terminals with a reference voltage.

The invention further provides a system comprising an encoder and a decoder, each as set out above, the particular features of the encoder of the system being selected so that the encoder and decoder co-operate to transfer data between them.

An embodiment of the present invention will now be described with reference to the accompanying drawings.

Figure 3:
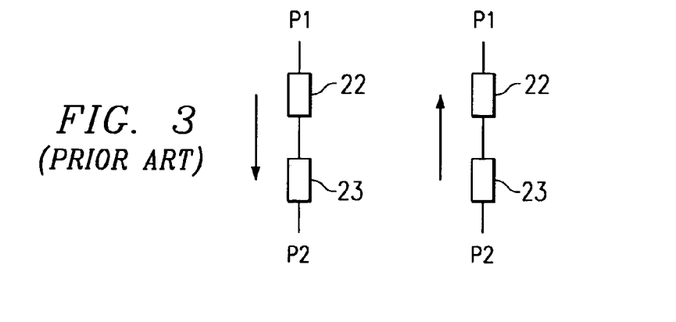
FIG. 3 is a representation of the symbols transmitted by the system of FIGS. 1 and 2.

FIG. 3 shows a representation of the data symbols that can be transmitted using the system of FIGS. 1 and 2. FIG. 3 shows resistors 22 and 23 (corresponding to resistors 12 and 13 of the receiver of FIGS. 1 and 2) connected in series between a node P1 and a node P2 which would be respectively connected to the conductors from the transmitter. A first data symbol is represented by a current flow from node P1 to node P2: a second data symbol is represented by a current flow from node P2 to node P1.

Figure 4:
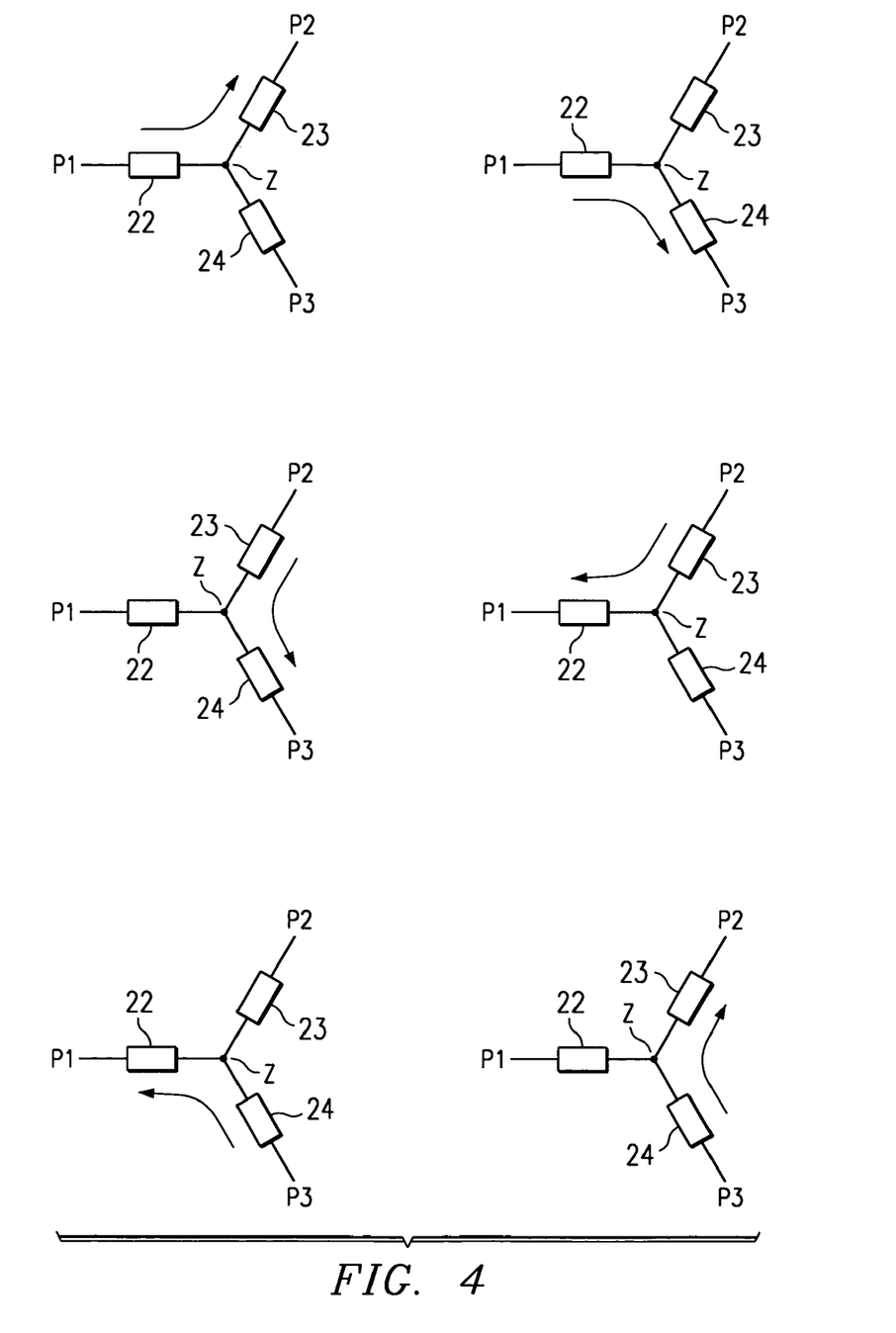
FIG. 4 is a representation of the symbols transmitted by a 3-path system in accordance with the present invention.

The present invention extends the transmission of symbols by adding a third resistor, as shown in FIG. 4. FIG. 4 shows resistors 22, 23 and 24 with a first terminal connected to nodes P1, P2 and P3 respectively and each having a second terminal connected to a common node Z. FIG. 4 shows the six symbols that can be transmitted using that configuration of resistors, namely: a current flow from node P1 to node P2 via resistors 22 and 23; a current flow from node P1 to node P3 via resistors 22 and 24; a current flow from node P2 to node P3 via resistors 23 and 24; a current flow from node P2 to node P1 via resistors 23 and 22; a current flow from node P3 to node P1 via resistors 24 and 22; and a current flow from node P3 to node P2 via resistors 24 and 23.

Figure 5:
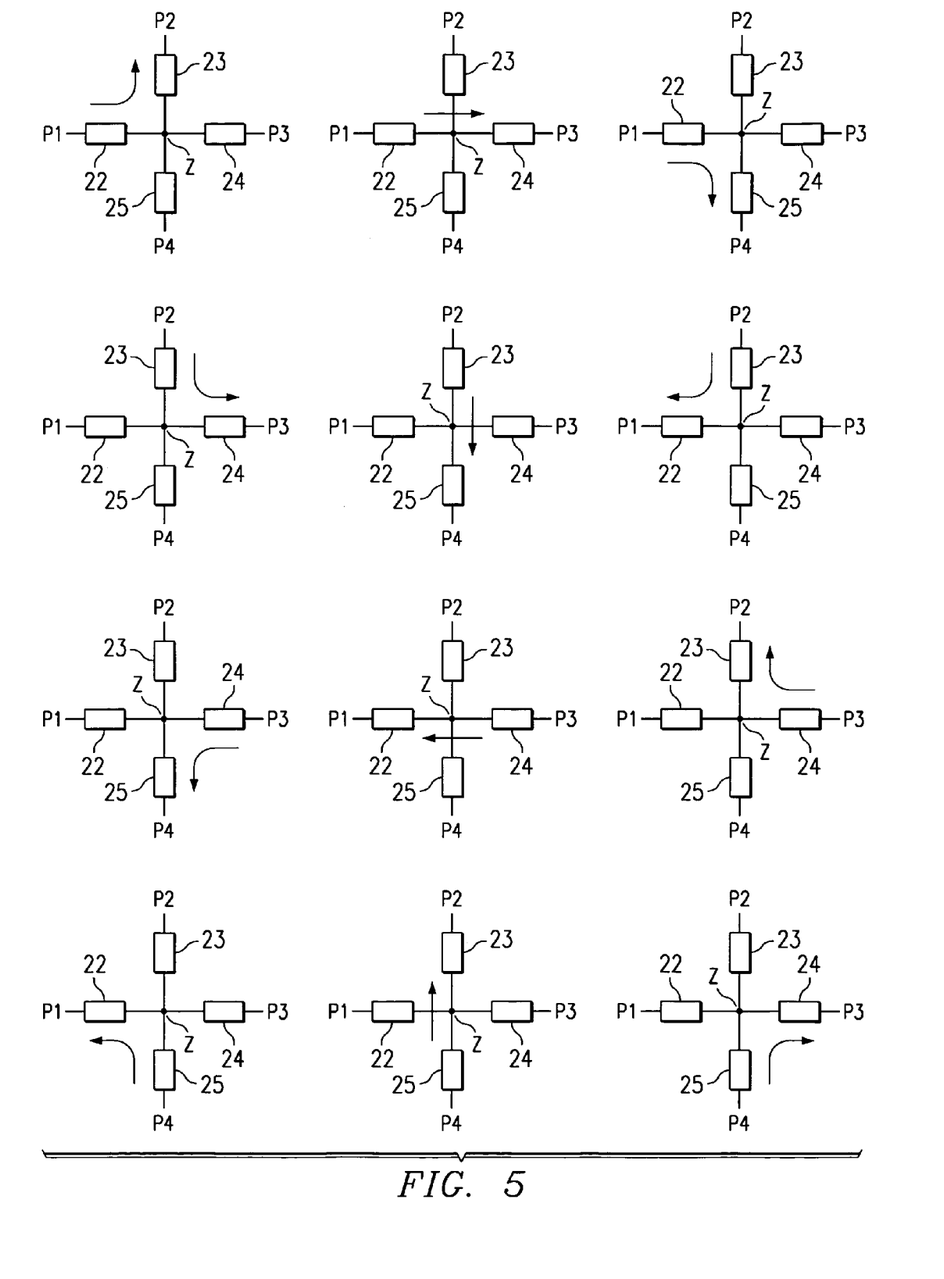
FIG. 5 is a representation of the symbols transmitted by a 4-path system in accordance with the present invention.

A fourth resistor 25 may be added coupled between a node P4 and the common node Z, as shown in FIG. 5, a further six symbols can be transmitted i.e. current flows from node P4 to each of nodes P1, P2 and P3, and current flows, in the opposite sense, from each of nodes P1, P2 and P3 to node P4. Further resistors may be added.

In preferred embodiments of the invention a set of resistors is employed at the transmitter and receiver in the manner of FIGS. 1 and 2 with each of the nodes connected to the respective transmission line.

For every symbol transmitted using the extended system described above, there are two active nodes, with the symbol transmitted being represented by which of the nodes are active and also the sense of current flow in the active two.

The system of the invention can therefore have N nodes where N>=3. In such a system, current can be passed from any one of the N nodes and return through any one of the N−1 remaining nodes. Therefore the total number of symbols (S), distinguished in that way, that can be transmitted is given by:

$$S=N(N-1)$$

The number of bits (B) of information contained in one such symbol is given by:

$$B=\log_2(S) \text{ where } \log_2 \text{ is the logarithm to base } 2$$

In general, B will be a non-integer value. The transmission system will, in a simple example, be driven from a data encoder operating on a given number of usable bits ($B_u$), that number being given by:

$$B_u=int(B) \text{ where } int(B) \text{ is the integer part of } B$$

The number of usable symbols ($S_u$) is given by:

$$S_u=2^{B_u}$$

There will be a number of unused symbols, which may be used for other purposes, for example as control signals. One of the unused symbols could be used to indicate invalid data; such a symbol may be transmitted when there is no data to be transmitted down a channel but nevertheless it is desired to transmit a symbol anyway, for example, so that the receiver knows that the channel is working. Another use of a spare symbol is to replace the second of a repeated symbol to ensure that adjacent symbols are always different. These are useful for transmission links that require clock recovery at the receiver end since using such a "ditto" symbol D ensures an edge in the transmitted data. If a symbol S is repeated several times a sequence that can be transmitted is SDSD . . . . If there is an extended period of invalid data edges in the data can be maintained by transmitting the invalid data symbol alternately with the ditto symbol.

In the N-node system described above, N input/output pins are required to convey $B_u$ bits of data. In a conventional differential system, this would require $2.B_u$ input/output pins. The ratio of these gives a pin usage factor. This equates to 75% for a 3-node system, dropping further to an optimum value of 62.5% for a 5-node system. For N>5, the pin usage factor generally increases although it remains below 100% for N<14.

The power dissipation of the data link is constant, regardless of the number of nodes, since there are only ever two active nodes. The relative power dissipation compared with the distribution of the equivalent number of bits using connection differential transmission system is given by (1/Bu).

The number of nodes that can be used is restricted only by the practicability of the physical implementation of the transmission system. For most practical purposes, it is envisaged that 3, 4 or 5 node systems will probably offer the most optimal solutions.

Although the system has been described in terms of the load resistors those are not an essential feature of the invention. Without them symbols transmitted on a set of three or more conductors may still be distinguished by which carries the current in one sense and which carries it in the other, or alternatively which is at a high voltage and which is at a low voltage.

Figure 6:
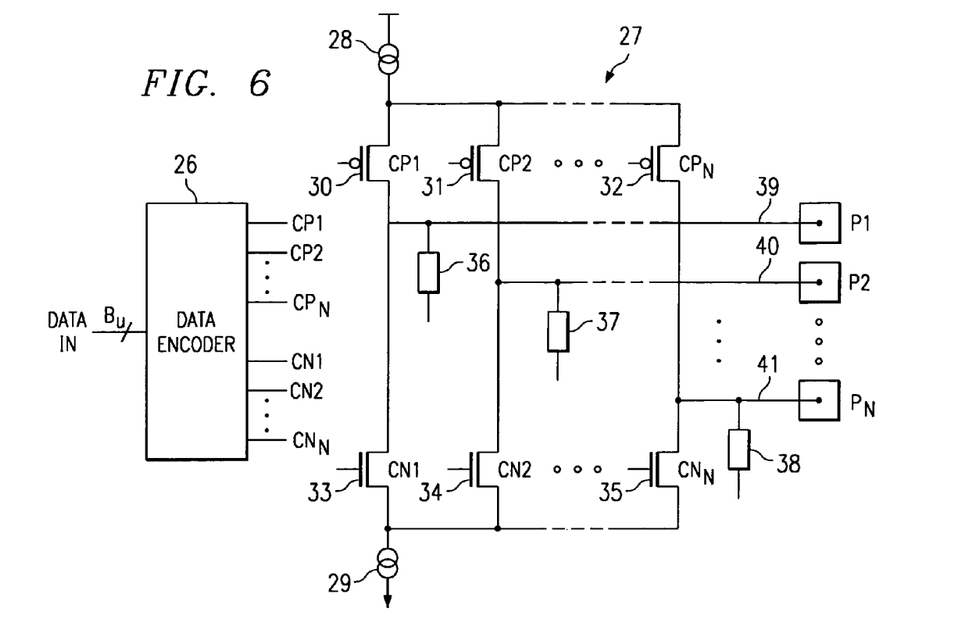
FIG. 6 is a circuit schematic of a transmitter in accordance with the present invention.

A suitable transmitter for use in an N-node (i.e. an N conductor) system in accordance with the present invention is shown in FIG. 6. That transmitter consists of a data encoder 26, that takes the incoming data bits ($B_u$) and generates two sets of control signals ($C_{P1}$ to $C_{Pn}$ and $C_{N1}$ to $C_{Nn}$), and a transmitter, indicated generally by the reference numeral 27, that takes the control signals and generates a set of outputs ($P_1$ to $P_n$) for transmission.

Transmitter 27 comprises current source 28 and sink 29, PMOS transistors 30 to 32, NMOS transistors 33 to 35, resistors 36 to 38 and conductors 39 to 41. Current source 28 is coupled to the sources of each of PMOS transistors 30 to 32, the drains of transistors 30 to 32 are connected to the drains of NMOS transistors 33 to 35 respectively and the sources of NMOS transistors 33 to 35 are all connected to the current source 29. The drains of PMOS transistors 30 to 32 and NMOS transistors 33 to 35 are also connected to a first terminal of resistors 36 to 38 respectively. Second terminals of each of resistors 36 to 38 are held at 1.2V (the common mode voltage). The gates of PMOS transistors 30 to 32 are connected to outputs $C_{P1}$, $C_{P2}$ and $C_{Pn}$ of the data encoder 26 respectively and the gates of NMOS transistors 33 to 35 are connected to the outputs $C_{N1}$, $C_{N2}$ and $C_{Nn}$ of the data encoder respectively.

One of PMOS transistors 30 to 32 is turned on by pulling one of inputs $C_{P1}$ to $C_{Pn}$ low. Similarly, one of NMOS transistors 33 to 35 is turned on by pulling one of inputs $C_{N1}$ to $C_{Nn}$ high. For example with $C_{P1}$ low and $C_{N2}$ high (and with $C_{P2}$ and $C_{PN}$ high and $C_{N1}$ and $C_{Nn}$ low); PMOS transistor 30 and NMOS transistor 34 will be on, the remaining transistors being off. In those circumstances, a current path exists from current source 28 to resistor 36 via PMOS transistor 30 and from resistor 37 to current source 29 via NMOS transistor 34. Further, the second terminals of resistors 36 and 37 are connected so that a current flows from current source 28 to current sink 29 via those resistors and transistors 30 and 34. The selection of transistors is made by the data encoder 26 selecting which one of signals $C_{P1}$ to $C_{Pn}$ is low and which one of signals $C_{N1}$ to $C_{Nn}$ is high.

In the example given above, the output 39 will be pulled high (to 1.4V) and the output 40 will be pulled low (to 1.0V). The remaining outputs (in this case only output 41, but in an N-node system there will be N-2 such outputs) being at 1.2V (the common mode voltage). Thus the symbol for transmission is indicated by the active outputs (the ones not at the common mode voltage) and the polarity of the active outputs (i.e. which one is above and which one is below the common mode voltage). When a load is connected to the outputs this polarity is of course equivalent to the sense of the currents in the two active outputs.

Figure 7:
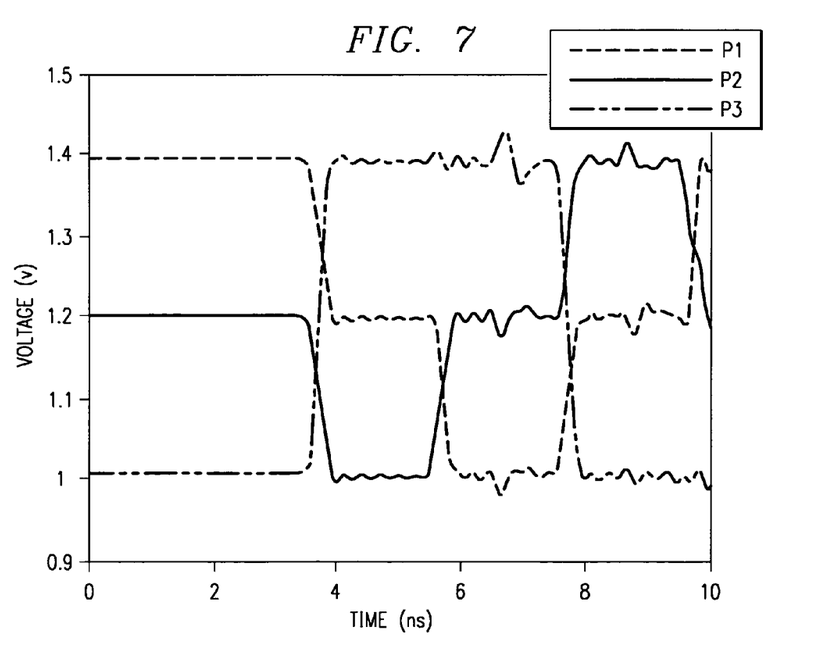
FIG. 7 shows example waveforms at the outputs of the circuit of FIG. 6.

FIG. 7 shows the signals P1 to P3 on conductors 39 to 41 from a simulation of the circuit of FIG. 6 operating at a 500 Mb/s data rate based on a 0.35 µm CMOS technology. Initially, P1 is high, P3 is low and P2 is at the common mode voltage. At 4 ns, P3 goes high, P2 goes low and P1 moves to the common mode voltage. Finally, after 8 ns seconds, P2 goes high, P3 goes low and P2 moves to the common mode voltage. Thus four of the possible six data symbols are shown.

Figure 8:
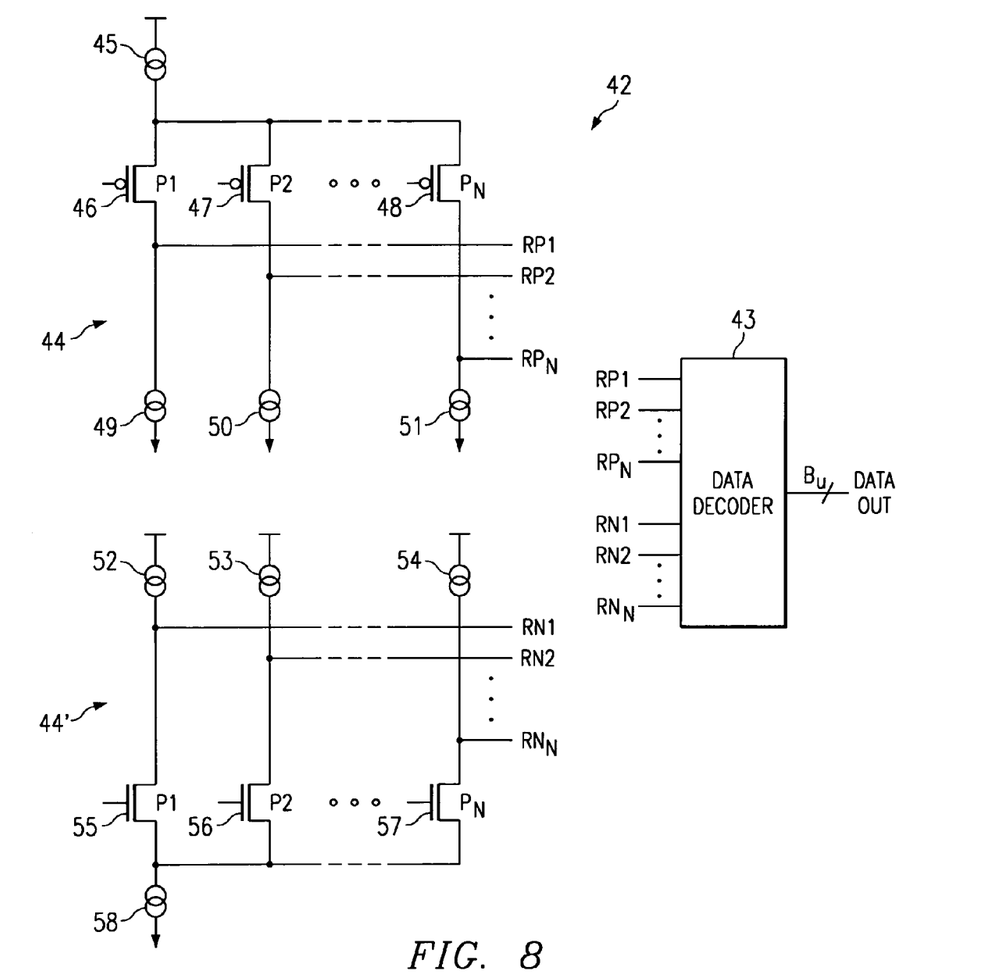
FIG. 8 is a circuit schematic of a receiver in accordance with the present invention.

FIG. 8 shows a circuit capable of receiving and decoding the signals transmitted using the transmitter of FIG. 6. The receiver of FIG. 8 consists of a receiver circuit, indicated generally by the reference numeral 42, and a data decoder 43. The receiver 42 takes the outputs $P_1$ to $P_N$ of the transmitter 27 and generates two sets of signals: $R_{P1}$ to $R_{PN}$ and $R_{N1}$ to $R_{NN}$. Data decoder 43 takes the signals $R_{P1}$ to $R_{PN}$ and $R_{N1}$ to $R_{NN}$ and regenerates the data signal $B_u$ transmitted by the transmitter 27.

Receiver 42 comprises sub-circuits 44 and 44'. Sub-circuit 44 comprises current source 45, PMOS transistors 46 to 48, current sources 49 to 51 and generates the signals $R_{P1}$ to $R_{PN}$.

Current source 45 provides a current I and is coupled to the source of each of PMOS transistors 46 to 48. The drains of PMOS transistors 46 to 48 are coupled to current sources 49 to 51 respectively, each of those current sources providing a current I/N. The gates of PMOS transistors 46 to 48 are connected to the $P_1$, $P_2$ and PN inputs respectively. The drains of PMOS transistors 46 to 48 provide the signals $R_{P1}$ to $R_{PN}$ respectively.

Sub-circuit 44' comprises current sources 52 to 54, NMOS transistors 55 to 57, current source 58 and generates the signals $R_{N1}$ to $R_{NN}$.

Current sources 52 to 54 each have a value I/N and are coupled to the drains of NMOS transistors 55 to 57 respectively. The sources of NMOS transistors 55 to 57 are each coupled to current source 58, that current source having a value N. The gates of NMOS transistors 55 to 57 are connected to the $P_1$, $P_2$ and $P_N$ inputs respectively. The drains of NMOS transistors 55 to 57 provide the signals $R_{N1}$ to $R_{NN}$ respectively.

Assume for example that $P_1$ is high, $P_2$ is low and $P_N$ is at the common mode voltage. In sub-circuit 44, the gates of PMOS transistors 46 to 48 will be at 1.4V, 1.0V and 1.2V. The transistors are designed with sufficient gain so that under those circumstances, the transistor with the lowest input voltage, transistor 47, will conduct the majority of the current, the other transistors 46 and 48 becoming substantially turned off. Thus output $R_{P2}$ is pulled high via transistor 47 and outputs $R_{P1}$ and $R_{PN}$ are low. Similarly, in sub-circuit 44', the gates of NMOS transistors 55 to 57 will be at 1.4V, 1.0V and 1.2V respectively. Those transistors are designed so that, in those circumstances, only transistor 55 is turned on. Thus output $R_{N1}$ will be low and outputs $R_{N2}$ and $R_{NN}$ will be high.

The output of the first sub-circuit 44 that is high indicates which of PMOS transistors 30 to 32 in the transmitter of FIG. 6 was turned on. Similarly, the output of the second sub-circuit 44' that is low indicates which of NMOS transistors 33 to 35 in the transmitter of FIG. 6 was turned on. The decoder 43 decodes this information to regenerate the data transmitted by the transmitter.

Alternative implementations of the transmitter and the receiver are within the scope of the invention. For example, the receiver of FIG. 8 could be replaced with a number of comparators connected between each of the signal lines $P_1$ to $P_n$, the comparator outputs being decoded to identify the signal lines with the highest and lowest voltages and hence decoding the symbol transmitted. For systems with N>4, there will be more than one line at the common mode voltage, the comparators operation on these signals will consequently not produce a reliable output. The output of such comparators would, however, correspond to "don't care" conditions in the decode logic.

In the analysis above of the number of usable bits ($B_u$) that can be encoded by the invention it was assumed that a set of bits are encoded into a single symbol. It is possible, however, to encode a set of bits into several symbols, which may in some cases result in more efficient usage. For example two symbols in a 3-node system can encode 6×6=36 states, which may be used to encode 5 bits of data, with four states left over. If those symbols were used alone each would only be able to encode 2 bits, making a total of only 4 bits represented.

In the above examples the symbols transmitted have been represented by a constant voltage or current signal. It is within the scope of the invention to represent a symbol as varying signals, for example, containing edges or transitions, as is known for many other data transmission schemes.

In the above examples, two transmission lines, or nodes, are active and it is possible to distinguish between them, as denoted by the arrows in FIGS. 3 and 4, thus allowing two symbols to be distinguished for each active pair of lines. In a more general version of the invention however no distinction is made between the active lines. This halves the number of symbols available but means that identical signals may be used on the active lines. In one example a symbol is represented by a few cycles of a sinusoid transmitted by a differential driver to the active lines. The receiver, however, is only responsive to the presence of a sinusoidal waveform of the appropriate frequency and not the phase difference of that on the two active lines.

The invention claimed is:

1. A LVDS system for transmitting symbols on a set of at least three parallel channels, the system comprising for each symbol an active signal on each of two of those channels and an inactive signal on the remaining channel or channels, the symbols being distinguishable by which two of the channels have the active signals, wherein one of the active signals is provided as a current of a first sense and the other active signal as a current of a second sense, the first and second sense being opposite to each other.

2. A system as claimed in claim 1 wherein the two active signals are of different form allowing them to be distinguished from each other, the symbols being further distinguishable thereby.

3. A system as claimed in claim 1 wherein one of the active signals is an electrical signal at a first voltage level and the other is an electrical signal at a second voltage level.

4. A system as claimed in claim 3 wherein the inactive signal or signals is an electrical signal at a voltage level intermediate to the first and second voltage levels.

5. A system as claimed in claim 4 wherein the inactive signal is at a voltage level substantially half-way between the first and second voltage levels.

6. A system as claimed in claim 1 wherein the inactive signal has a current that is substantially zero.

7. A method of transmitting data comprising encoding it as a series of symbols using the active signals claimed in claim 1.

8. An encoder of a LVDS system for transmitting data symbols from a set of at least three terminals, the encoder being arranged to provide for each of the symbols an active signal on two of the terminals of the set while providing an inactive signal on the remaining terminal or terminals of the set, the encoder also being arranged to provide one of the active signals as a current of a first sense and the other active signal as a current of a second sense, the first and second senses being opposite to one another.

9. An encoder as claimed in claim 8 wherein the encoder is arranged to provide the two active signals in different form allowing them to be distinguished from each other.

10. An encoder as claimed in claim 9 arranged to provide one of the active signals as an electrical signal at a first voltage level and the other active signal as an electrical signal at a second different voltage level.

11. An encoder as claimed in claim 10 arranged to provide the inactive signal or signals as an electrical signal at a voltage level intermediate to the first and second voltage levels of the active signals.

12. An encoder as claimed in claim 11 wherein the inactive signal is at a voltage level substantially half-way between the first and second voltage levels.

13. An encoder as claimed in claim 8 wherein the inactive signal or signals are provided by not actively providing a current signal on the remaining terminal or terminals.

14. An encoder as claimed in claim 9 comprising first and second sets of switches, one switch from each of the first and second sets being connected to a respective one of the terminals, the encoder being arranged to activate a selected one of the first set of switches in order to provide one of the active signals on the terminal to which that switch is connected and the encoder arranged to activate a selected one of the second set of switches in order to provide the other active signal on a terminal to which that switch is connected.

15. An encoder as claimed in claim 14 wherein the remaining switches are inactive in order to provide an inactive signal on each remaining terminal.

16. An encoder as claimed in claim 14 or claim 15 wherein each switch in the first set of switches is coupled to a first voltage level and each switch in the second set of switches is coupled to a second voltage level.

17. An encoder as claimed in claim 14 or claim 15 wherein each switch in the first set of switches is coupled to a first current source and each switch in the second set of switches is coupled to a second current source.

18. An encoder as claimed in claim 14 wherein each terminal of the encoder is coupled, via a resistor, to a common node.

19. An encoder as claimed in claim 18 wherein the common node is at a/the voltage level intermediate to the voltage levels on the terminals carrying the first and second active signals.

20. A LVDS system comprising:
an encoder of the LVDS system for transmitting data symbols from a set of at least three terminals, the encoder being arranged to provide for each of the symbols an active signal on two of the terminals of the set while providing an inactive signal on the remaining terminal or terminals of the set, the encoder also being arranged to provide one of the active signals as a current of a first sense and the other active signal as a current of a second sense, the first and second senses being opposite to one another; and
a decoder of the LVDS system for receiving data symbols presented at a set of at least three terminals, the decoder being arranged to detect which two of the terminals have an active signal and to identify in response which symbol is being received.

* * * * *